United States Patent [19]

Bachmann et al.

[11] Patent Number: 4,802,733
[45] Date of Patent: Feb. 7, 1989

[54] FLUORINE-DOPED OPTICAL FIBRE AND METHOD OF MANUFACTURING SUCH FIBRE

[75] Inventors: Peter K. Bachmann; Peter E. E. Geittner; Dieter Leers; Howard J. C. Wilson, all of Aachen, Fed. Rep. of Germany

[73] Assignee: U.S. Philips Corp., New York, N.Y.

[21] Appl. No.: 814,842

[22] Filed: Dec. 30, 1985

[30] Foreign Application Priority Data

Nov. 1, 1985 [DE] Fed. Rep. of Germany ....... 3500672

[51] Int. Cl.$^4$ ............................ G02B 6/00; G02B 6/10; C03C 25/02
[52] U.S. Cl. ................................ 350/96.34; 350/96.30; 65/3.11
[58] Field of Search ........................... 350/96.30, 96.34; 65/3.11, 3.12, DIG. 16

[56] References Cited

U.S. PATENT DOCUMENTS

| | | | |
|---|---|---|---|
| 3,607,322 | 9/1971 | Brady et al. | 350/96.34 X |
| 4,062,665 | 12/1977 | Izawa et al. | 65/3 |
| 4,206,968 | 6/1980 | Suganuma et al. | 350/96.34 X |
| 4,367,013 | 1/1983 | Guerder et al. | 350/96.34 |
| 4,372,647 | 2/1983 | Okahoto et al. | 350/96.33 |
| 4,425,146 | 1/1984 | Izawa et al. | 65/DIG. 16 |
| 4,441,788 | 4/1984 | Guerder et al. | 350/96.34 |
| 4,468,413 | 8/1984 | Bachman | 427/39 |
| 4,504,114 | 3/1985 | Arrington | 350/96.34 |
| 4,519,826 | 5/1985 | Tran | 65/3.11 |
| 4,586,943 | 5/1986 | Kyoto et al. | 65/3.12 |

FOREIGN PATENT DOCUMENTS 1162948 2/1984 Canada .
3318589 11/1984 Fed. Rep. of Germany .

*Primary Examiner*—William L. Sikes
*Assistant Examiner*—Akm E. Ullah
*Attorney, Agent, or Firm*—Ernestine C. Bartlett

[57] ABSTRACT

In an optical fiber based on silicon dioxide with fluorine doping which determines its refractive index profile, at least in the light transmitting core a substance is added that increases the thermal expansion coefficient. The added substance is uniformly distributed at least in the light transmitting core, and reduces the influence of the drawing force $F_Z$ (during drawing of the preform) on the Rayleigh scattering $\alpha_R$ and the wavelength-independent "c term" losses. Even at high fluorine dopant concentrations, low Rayleigh scattering losses in the range of the material-intrinsic losses pure for silicon dioxide are achieved. The OH-contamination level is also further reduced, and cracks in the collapsed preforms are largely avoided.

15 Claims, 2 Drawing Sheets

FLUORINE-DOPED OPTICAL FIBRE AND METHOD OF MANUFACTURING SUCH FIBRE

BACKGROUND OF THE INVENTION

The invention relates to an optical fiber based on silicon dioxide. The fiber has fluorine doping that determines its refractive index profile at least in the light transmitting part thereof, which part generally is called the core. The invention further relates to a method of manufacturing such an optical fiber in which a preform is produced by reactive deposition of silicon dioxide and fluorine from a reactive gas mixture. An optical fiber is manufactured from the preform. The processing of the preform into an optical fiber is usually done by a collapsing and/or drawing operation.

Optical fibers of the aforesaid kind are described in DE-OS No. 32 05 345 (corresponding to U.S. Pat. No. 4,468,413). Also known are fluorine-doped optical fibers in which the refractive index profile is determined not by the fluorine dopant but by other substances, while the fluorine dopant eliminates, for example, unwanted fluctuations in refractive index (DE-OS No. 30 31 147, corresponding to Canadian Pat. No. 1,162,948) or to give low OH-absorption (DE-OS No. 33 18 589).

It is further described in DE-AS No. 27 15 333 (corresponding to U.S. Pat. No. 4,062,665) that the thermal expansion coefficients of core and cladding of an optical fiber preform can be matched to one another so as to avoid crack formation.

Manufacturing methods of the aforementioned kind are for example the thermal deposition methods OVPO, MCVD and VAD, and also the PCVD method; cf DE-OS No. 32 05 345.

The exclusive use of fluorine-containing compounds as dopants for adjusting the refractive index profile offers the possibility of manufacturing optical fibers with various refractive index profiles in which the central region or core can largely consist of pure $SiO_2$. Particular advantages thereby achieved are the avoidance of central "dips" (profile distortions originating during the collapsing operation), the low intrinsic scattering losses of $SiO_2$ compared with those in other doping systems, the favorable material-dispersive properties of this system of monomode applications, and the comparatively low cost of fluorine-containing basic substances. In addition it is possible to easily obtain special profile structures, as for example "fully depressed" monomode structures (in which the refractive index distributions of the light transmitting core are below the refractive index of $SiO_2$) and multimode structures with high numerical aperture.

In the investigations that resulted in the invention it was found that the advantageous optical properties achieved were subject to the following restrictions.

1. The material-intrinsic Rayleigh scattering losses of pure $SiO_2$ were not experimentally attained, even with ideal light transmitting structures ($SiO_2$ in the core, fluorine doped $SiO_2$ in the cladding).

2. In fiber structures comprising only fluorine as the dopant the optical losses—compared with those in other doping systems—showed a distinct dependence on the drawing conditions. Rayleigh scattering and wavelength—independent scattering losses ("c term" losses) thereby depend in particular on the drawing force with which the fiber is drawn from the preform: high drawing forces result in low c-terms and increased Rayleigh scattering losses, whereas low drawing forces result as a rule in increased c-terms with at the same time low Rayleigh losses. This behavior raises problems for an absolute optimization of the drawing process; moreover the relative "optimum drawing conditions" for the pure fluorine-doping system differ distinctly from those of other doping systems (e.g. $GeO_2$).

3. It was found experimentally that an increase in the proportion of fluorine-containing compounds in the reactive gas mixture to concentrations of more than 2 to 3 mol% (related to the chloride-gas proportions) does not result in any further reduction of OH-absorption losses; for high fluorine-dopant concentrations (maximum refractive index difference between core and cladding greater than the typical $\Delta n \simeq 1.5 \times 10^{-2}$) it was observed that the OH-absorption losses were to some extent even higher than in fibers from low fluorine-dopant concentrations.

4. In spite of the somewhat comparable thermal expansion coefficients of pure $SiO_2$ and fluorine-doped $SiO_2$, cracks increased in the cladding of the collapsed preform.

SUMMARY OF THE INVENTION

It is an object of the invention to improve the properties of fluorine doped fibers. In particular, it is an object of the invention to reduce the influence of the drawing conditions on the optical properties (Rayleigh scattering and wavelength-independent "c-term" losses) to permit the manufacture of fluorine-doped fiber structures with Rayleigh scattering losses in the range of the material-intrinsic losses for pure $SiO_2$ with at the same time low c-term losses, and to further reduce OH-absorption losses for high fluorine-dopant concentrations. At the same time, however, the advantages of fluorine doping in regard to all other optical properties should be fully preserved.

This object is achieved by the invention in that an optical fiber contains a quantity of at least a substance which increases the thermal expansion coefficient and which is uniformly distributed at least in the light transmitting core of the optical fiber.

The invention thus provides an optical fiber which, in addition to the fluorine dopant (which mainly determines the refractive index) contains at least a further substance which increases the thermal expansion coefficient and which is uniformly distributed at least in the light transmitting core of the fiber.

For the manufacture of the optical fiber according to the invention, a reactive substance is added to the reaction gas mixture at least during the deposition of the light transmitting part of the fiber. The reactive substance is added in a constant quantity. The reaction product of the reactive substance increases the thermal expansion coefficient of the deposited material.

The choice of suitable codopants and the necessary concentrations of the corresponding additives to the reactive gas phase is guided by the condition that the thermal expansion coefficient $$(\alpha deposit)_{therm.}$$

of the deposited material shall be larger in the final, compacted perform than the thermal expansion coefficient (αcladding)
therm.

of the surrounding cladding material. This produces a compressive stress in the cladding of the collapsed preform. This condition can be checked in a simple manner by optically measuring the stress relationships in the preform using polarized light.

Codopants that can be used in this respect are, for example, phosphorous pentoxide or germanium dioxide. Preferably, however, germanium dioxide is used, which means that germanium tetrachloride is added to the reactive gas mixture. An advantage of this additive is that it has no negative influence on the optical properties, because no additional losses due to IR absorption in the range from 1.3 to 1.6 μm are introduced thereby.

The codopant should preferably be present in an amount of 0.5 to 3.0 mol%. This means that the concentration of the additive in the reactive gas phase should be such that the concentration of the codopant in the deposited material amounts preferably to 0.5 to 3.0 mol%. Below this range the required change in the thermal expansion coefficient is in most cases not yet sufficient. Above this range, the intrinsic Rayleigh scattering losses, which increase with the codoping concentration, may already have a distinct negative effect on the optical properties of the fibers in some cases.

For the reactive deposition, the PCVD process is preferably used. In this process, compact glass layers are directly obtained without sintering. This is because the PCVD process makes it possible in a particularly efficient and simple manner to deposit pure $SiO_2$, and also to manufacture light-conducting structures with high optical refractive index differences ($>2.10^{-2}$) by pure fluorine doping. In the thermal deposition processes (OVPO, MCVD and VAD) the high sintering temperatures required for $SiO_2$ and the greatly reduced process yields due to etching reactions give rise to fundamental problems when high fluorine concentrations are used.

The positive effect on the optical properties of the fibers (in particular on the properties of optical fibers with high fluorine doping) is achieved by the invention independently of a special index profile (i.e. for both monomode and graded index multimode fibers).

DESCRIPTION OF THE PREFERRED EMBODIMENTS

Figure 1:
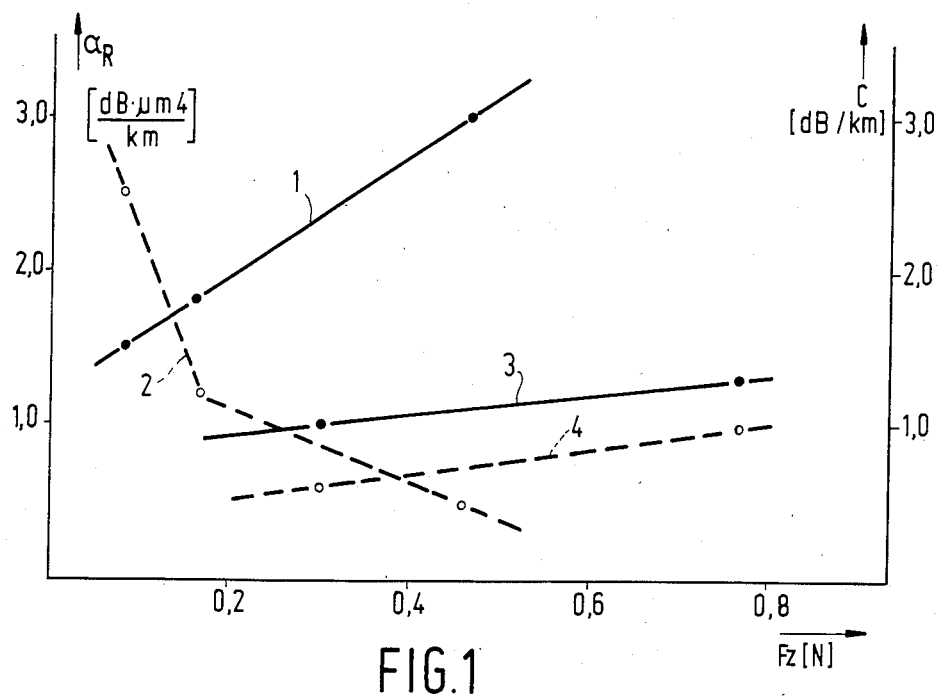
FIG. 1 is a graph showing how the Rayleigh scattering losses and the wavelength-independent scattering losses depend on the drawing force.

For the $GeO_2/SiO_2$ doping systems comprehensive data are available concerning the material-intrinsic optical losses, and in particular concerning the dependence on the dopant concentration and the possible influence of drawing conditions. Typical values for the Rayleigh scattering loss term $\alpha_R$ in different types of fibers are $\alpha_R \approx 0.9$ to 1.0 dB μm$^4$/km (monomode fiber, $\Delta_{CO} \approx 0.3\%$), $\alpha_R \approx 1.1$ to 1.3 dB μm$^4$/km (graded index multimode fiber, $\Delta_{CO} \approx 1.0\%$) and $\alpha_R \approx 1.5$ to 1.7 dB μm$^4$/km (multimode fiber with high numerical aperture, $\Delta_{CO} \approx 2.0\%$). Here $\Delta_{CO}$ is the reactive maximum difference in refractive index between the core and cladding materials of the fiber.

The Rayleigh scattering losses in this $GeO_2/SiO_2$ system are largely independent of the drawing conditions, of the method of manufacture and also of the small amounts of codopants that may be used (for example fluorine obtained with $C_2F_6$ as an additive); residual effects are included in the data mentioned above. Wavelength-independent optical scattering losses (c-terms) can be kept negligibly small in this material system for all above-mentioned types of fiber (i.e. typically smaller than 0.1 dB/km) given optimized deposition and drawing operations.

What is to be considered, therefore, is mainly the pure material-intrinsic, approximately linear dependence of the Rayleigh term $\alpha_R$ on the dopant concentration. During the PCVD deposition a proportion of 15 mol% $GeCl_4$ in the total chloride gas flow leads to a relative increase in the refractive index $\Delta_{CO}$ of about 1% and to a Rayleigh scatter term of about 1.1 to 1.3 dB μm$^4$/km; extrapolation to the case of a pure $SiO_2$ deposition yields an intrinsic Rayleigh scattering loss term of $\alpha_R(SiO_2) \approx 0.7$ to 0.8 dB μm$^4$/km.

It was therefore to be expected that the exclusive use of fluorine-containing compounds as the dopant in the PCVD process would lead to distinctly lower optical losses, in view of the possibility of depositing largely pure $SiO_2$ in the light transmitting core, compared with the $GeO_2/SiO_2$ material system. As FIG. 1 shows, however, this behavior for profile structures obtained by doping with fluorine only could not be confirmed on an experimental basis. In comparison with the data for the $GeO_2/SiO_2$ system, distinctly higher values for Rayleigh scattering $\alpha_R$ and c-term losses were found for fibers containing only fluorine as a dopant. These values moreover showed a pronounced dependence on the drawing force $F_Z$ (measured in Newtons=N). Given unchanged drawing conditions (compared with the optimum drawing conditions for the $GeO_2/SiO_2$ material system) the corresponding optical data for a highly fluorine-doped $F/SiO_2$ material system are about $\alpha_R \approx 2.5$ dB μm$^4$/km and $c \approx 0.8$ dB/km ($\Delta_{CO} \approx 2\%$, cf FIG. 1, Curve 1: Rayleigh scattering, Curve 2: c-term). In this material system it is not possible to optimize the drawing process in the direction of a simultaneous reduction of both loss terms in accordance with FIG. 1, Curves 1 and 2.

If, however, small amounts of $GeCl_4$ ($GeO_2$ codoping in the $SiO_2/F$ system) are added to the gas phase during the deposition of highly fluorine-doped material, it is surprisingly found that both the absolute values for the Rayleigh scattering and c-terms and also their dependence on the drawing force are distinctly reduced. Under standard drawing conditions, the corresponding data for the SiO$_2$/F material system codoped with GeO$_2$ amount to only $\alpha_R \simeq 1.0$ dB $\mu m^4$/km and c≃0.6 dB/km ($\Delta_{CO}=2\%$; cf FIG. 1, Curve 3: Rayleigh scattering, Curve 4: c-term).

The residual dependence of both optical loss terms on the drawing conditions (which is found here as well) permits, in contrast to the pure SiO$_2$/F system, a further and successful optimization of the drawing conditions. In particular, the Rayleigh scattering terms for the highly fluorine-doped and simultaneously GeO$_2$-codoped material system are clearly lower than those of the pure SiO$_2$/F and SiO$_2$/GeO$_2$ doping systems. In addition, in this material system, with the maximum relative refractive index differences between the core and the surrounding cladding material of $\Delta_{CO}=2\%$, the Rayleigh scattering losses found are close to the value expected for pure SiO$_2$. To achieve those improved optical properties with the method according to the invention, it is sufficient to use relative proportions of GeCl$_4$ in the gas phase amounting typically to 1 to 4 mol% (related to the total chloride gas flows).

Figure 2:
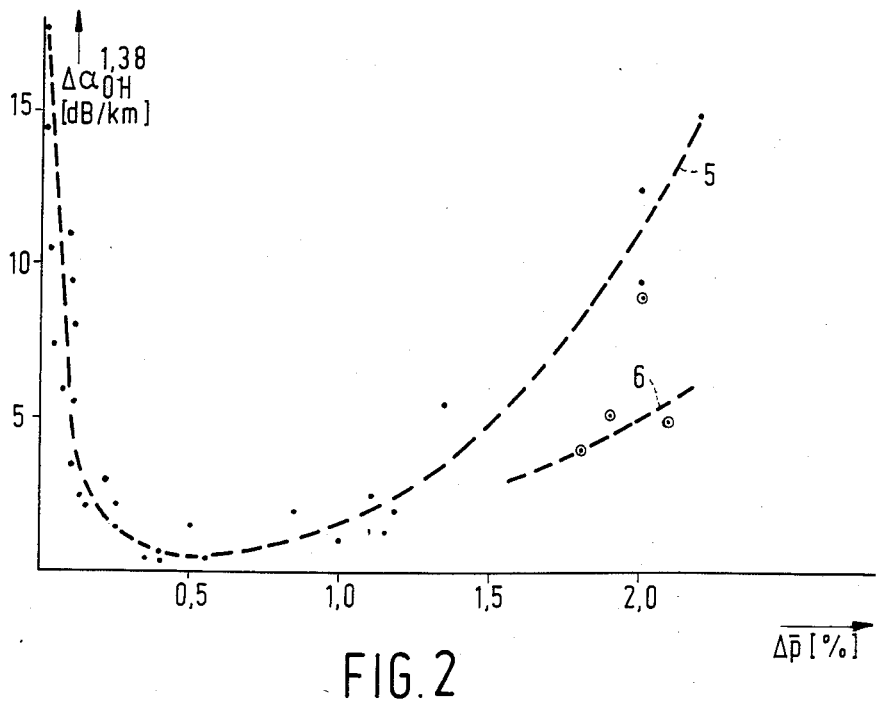
FIG. 2 is a graph showing how the incorporation of OH-impurities depends on the refractive index difference.

It was found, moreover, that a GeO$_2$ doping surprisingly not only resulted in the improvements described, but at the same time reduced the incorporation of OH-contaminations during the deposition. This favorable behavior, as shown in FIG. 2, is particularly obtained with high fluorine doping, for example with C$_2$F$_6$ concentrations of sbout 3 mol% or more in the total chloride gas flow. Such concentrations result in relative refractive index differences between core and cladding material ($\Delta \bar{p}$) of about 1% or more in the deposited material.

An increase in the index differences $\Delta \bar{p}$ due to an increase in the fluorine dopant concentration (in the present case with C$_2$F$_6$ additive) leads in the pure SiO$_2$/F material system, for small concentrations, to a drastic reduction of the OH-contamination content (and hence of the additive absorption losses $\Delta \alpha_{OH}$ (1.38 $\mu$m)). In the case of dopant concentrations above about 2.5 mol% C$_2$F$_6$ ($\Delta \bar{p}$ of about 1% or more) the OH-contamination level again shows a distinct increase (see FIG. 2, Curve 5). The addition of small amounts of GeCl$_4$ according to the method of the invention leads particularly in these regions to a marked reduction of the OH-contamination level by a good 50% (see FIG. 2, Curve 6). In relation to the chloride gas flow, the GeCl$_4$ proportion in the gas phase was found again to be about 2 to 3 mol%.

Codoping according to the invention thus improves the optical properties of fluorine-doped fibers. In particular codoping reduces negative drawing effects, Rayleigh scattering, wavelength-independent scattering losses (c-terms) and absorption losses due to OH-contaminants. Surprisingly, crack formation in the collapsed preforms is also to a great extent suppressed. The positive effective is moreover independent of any special structure of the manufactured fibers, which means that the optical properties are improved to the same extent in the manufacture of fluorine-doped multimode and monomode fibers. The manufacture of different fiber structures will be elucidated with reference to the following examples.

Examples 1 and 2: Graded-Index Multimode Fibers

Highly fluorine-doped graded-index multimode preforms, manufactured by the PCVD process, were drawn under different drawing conditions into fibers. The fibers were subsequently measured to determine their optical losses. Except for the relative composition of the gas phase, the PCVD deposition parameters were kept constant in all experiments. The examples differ only in that in the case of Example 1 pure fluorine-doped SiO$_2$ was deposited, whereas in Example 2 small amounts of GeCl$_4$ were added as codopants in the gas phase. The PCVD deposition took place in both cases under the following experimental conditions.

SiO$_2$ substrate tubes with inner diameters of 15 mm and outer diameters of 18 mm where coated over a length of about 45 cm. The pressure in the deposition region was about 20 hPa. The substrate temperature was between 1200° and 1250° C. The microwave power was 750 Watts, and the traverse (stroke) velocity of the resonator along the support tube was 8 m/min. Altogether 2000 individual layers were deposited, corresponding to a total coating duration of about 120 min.

The reaction gas flows Q were as follows.

During the total duration of the deposition, the oxygen and SiCl$_4$ flows remained constant at respectively $\dot{Q}_{O_2}=800$ cm$^3$/min and $\dot{Q}_{SiCl_4}=100$ cm$^3$/min. The flow data refer to normal conditions (0° C., 1000 hPa). For obtaining the required graded index profile, the flow of the fluorine-containing reactive gas C$_2$F$_6$ was kept constant for about 60 minutes during the deposition of the optical cladding region at $\dot{Q}_{C_2F_6}=15$ cm$^3$/min, and subsequently, in the deposition of the optical core region, was reduced during the next 60 minutes (1000 layers) from 15 cm$^3$/min to 0.8 cm$^3$/min. The variation of $\dot{Q}_{C_2F_6}$ during the deposition of the core was performed in such a way that the final preform had a parabolic refractive index profile with a maximum relative refractive index difference of $\Delta_{CO} \simeq 2\%$. Under the prescribed flow conditions the maximum C$_2$F$_6$ concentration in the chloride gas phase thus amounted to about 13 mol%. The average deposition rate was about 0.3 g/min.

Example 1: Pure Fluorine Doping (SiO$_2$/F Material System)

Preforms manufactured by the PCVD process without using GeO$_2$-codoping were drawn into fibers under different drawing conditions and were optically measured. Drawing at 10 m/min at a furnace temperature of 2100° C. (drawing force F$_Z \simeq 0.08$N) led to Rayleigh scattering losses of 1.5 dB $\mu m^4$/km and c-term losses of 2.5 dB/km (FIG. 1, Curves 1 and 2, respectively). A drawing speed of 20 m/min at a drawing temperature of about 2000° C. (drawing force F$_Z \simeq 0.46$N) resulted in a change in the corresponding optical scattering loss terms to values of 2.5 dB $\mu m^4$/km and 0.5 dB/km, respectively. The absorption loss due to OH-contamination amounted in both cases to between 10 and 15 dB/km at 1.38 $\mu$m.

Example 2: Fluorine Doping with GeO$_2$ Codoping (SiO$_2$/F/GeO$_2$ Material System)

The addition of GeCl$_4$ in an amount of about 2.5 mol% in the total chloride gas flow ($\dot{Q}_{GeCl_4}=3.0$ cm$^3$/min) during the entire PCVD deposition led to the following change in the scattering loss terms under different drawing conditions. At a 20 m/min drawing speed and a drawing temperature of 2050° C. (standard drawing conditions for the SiO$_2$/GeO$_2$ material system, corresponding to a drawing force of about 0.3N) the Rayleigh scattering loss amounted to 1.0 dB $\mu m^4$/km and the c-term loss to about 0.6 dB/km. At 40 m/min and 2000° C. drawing temperature these values increased to 1.2 dB $\mu m^4$/km and 1.0 dB/km. The additional absorption losses due to OH-contamination decreased in both cases to values of 4 to 5 dB/km at 1.38 $\mu$m. The $GeO_2$ codoping led to a reduction of the relative maximum refractive index difference between core and cladding from 2% to 1.8 or 1.9%.

Examples 3 and 4: Monomode Fibers

Figure 3:
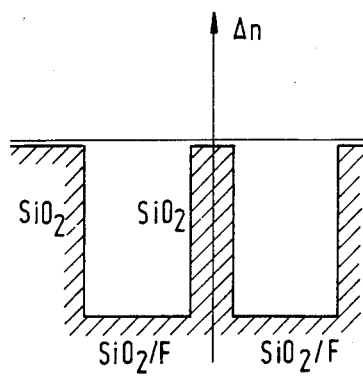
FIG. 3 schematically shows the refractive index profile Δn of a fluorine-doped monomode fiber, without codoping.
Figure 4:
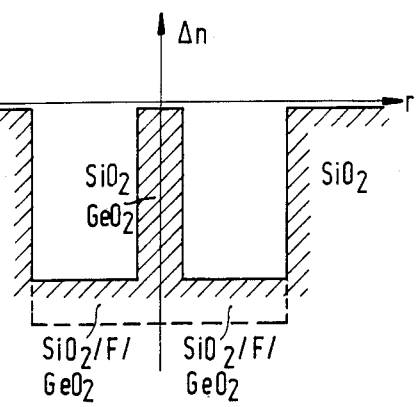
FIG. 4 schematically shows the refractive index profile Δn of a fluorine-doped monomode fiber with $GeO_2$ codoping.

Under the same deposition conditions as in Examples 1 and 2, monomode fibers with the refractive index profiles shown schematically in FIGS. 3 and 4 were manufactured. The following gas mixtures were kept used in the deposition process.

Example 3 (FIG. 3): For the core zone, in relation to $SiCl_4$, 0.35 mol% $C_2F_6$ was added. For the cladding zone, in relation to $SiCl_4$, 1.72 mol% $C_2F_6$ was added.

Example 4 (FIG. 4): For the core zone, in relation to $SiCl_4$, 0.35 mol% $C_2F_6$ and 2.65 mol% $GeCl_4$ were added.

For the cladding zone, in relation to $SiCl_4$, 1.25 mol% $C_2F_6$ and again 2.65 mol% $GeCl_4$ were added.

The refractive index profiles of both fiber preforms are largely identical. Under the same conditions, fibers were drawn from both preforms and their optical losses were measured.

The fibers in Example 3 exhibit a high Rayleigh scattering term of 3.15 dB $\mu m^4$/km. The fibers manufactured by the method of the invention (Example 4), in which the deposited material, due to the codoped $GeO_2$, has a higher coefficient of expansion than the surrounding cladding, exhibits on the other hand a low Rayleigh scattering term of 1.14 dB $\mu m^4$/km.

Figure 5:
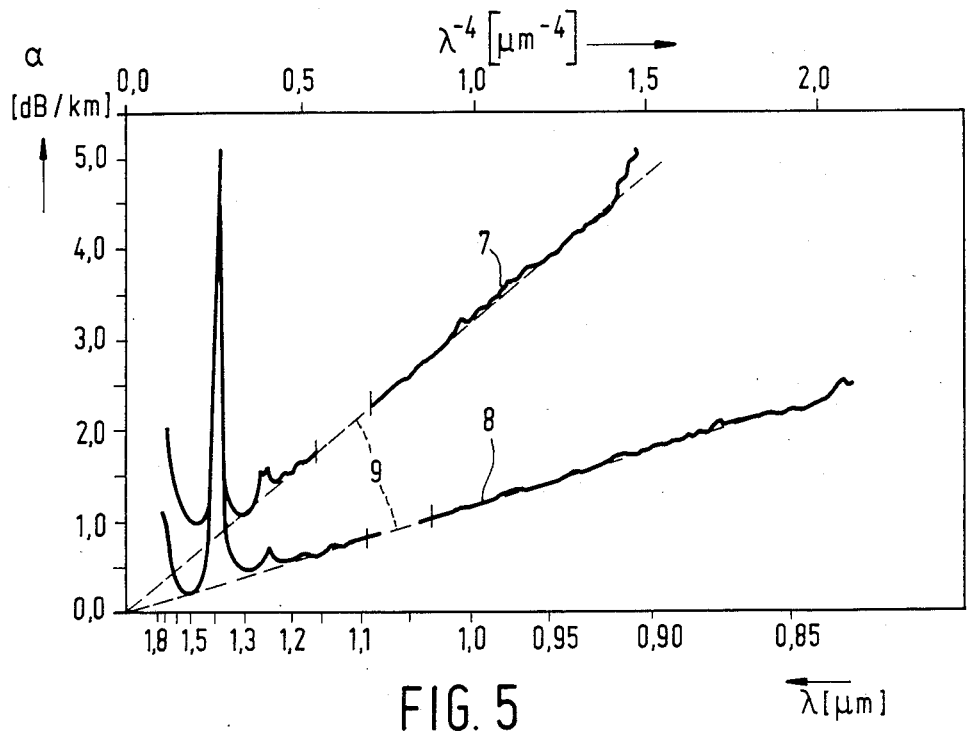
FIG. 5 shows the attenuation spectra of two monomode fibers, drawn under the same drawing conditions, with the different material compositions according to FIGS. 3 and 4.

The additional OH-absorption losses due to OH-contamination lie in both cases at about the same order of magnitude, being about 4 dB/km at 1.38 $\mu$m. This is shown by FIG. 5, which gives the attenuation $\alpha$ over the wavelength $\lambda$ and (at the upper edge) versus $\lambda^{-4}$. The latter plot demonstrates particularly well the ($\lambda^{-4}$) behavior of the Rayleigh scattering. Curve 7 shows the attenuation spectrum of the fiber for Example 3, Curve 8 shows it for the fiber in Example 4. The regions of the relevant cut-off wavelengths are marked 9. The cut-off wavelength is defined as the wavelength above which only the fundamental mode LP01 is conducted.

We claim:

1. An optical fiber comprising:
   a light-transmitting core having a thermal expansion coefficient, said core consisting essentially of silicon dioxide doped with a uniform concentration of fluorine and doped with a uniform concentration of a material which increases the thermal expansion coefficient of the core; and
   a cladding surrounding the core, said cladding having a thermal expansion coefficient less than the thermal expansion coefficient of the core, said cladding consisting essentially of silicon dioxide doped with a uniform concentration of fluorine, the concentration of fluorine in the cladding exceeding the concentration of fluorine in the core.

2. An optical fiber as claimed in claim 1, characterized in that the material which increases the thermal expansion coefficient of the core is germanium dioxide and the cladding adjoins the core.

3. An optical fiber as claimed in claim 2, characterized in that the core contains 0.3 to 3.0 mol% germanium dioxide.

4. An optical fiber as claimed in claim 1, characterized in that the core contains 0.3 to 3.0 mol% germanium dioxide.

5. An optical fiber comprising a light-transmitting core having a thermal expansion coefficient, said core consisting essentially of silicon dioxide doped with a nonuniform concentration of fluorine and doped with a uniform concentration of a material which increases the thermal expansion coefficient of the core.

6. An optical fiber as claimed in claim 5, characterized in that the core has a center, and the fluorine concentration increases with increasing distance from the center of the the core.

7. An optical fiber as claimed in claim 6, characterized in that the fluorine concentration increases with the square of the distance from the center of the core.

8. An optical fiber as claimed in claim 7, characterized in that the material which increases the thermal expansion coefficient is germanium dioxide.

9. An optical fiber as claimed in claim 8, characterized in that the core contains 0.3 to 3.0 mol% germanium dioxide.

10. An optical fiber as claimed in claim 5, characterized in that the core contains 0.3 to 3.0 mol% germanium dioxide.

11. A method of manufacturing an optical fiber, said method comprising the steps of:
    providing a cylindrical substrate; and
    depositing a plurality of glass layers on the substrate by reacting a gas mixture to form silicon dioxide and dopants, said glass layers forming an optical core and an optical cladding;
    characterized in that:
    during the deposition of the core glass layers the gas mixture consists essentially of a first reactant which forms silicon dioxide, a second reactant which forms fluorine, and a third reactant which forms a material which increases the thermal expansion coefficient of the glass layers;
    during the deposition of the core layers, the third reactant is provided in a constant amount; and
    the second reactant is provided in a varying amount.

12. A method as claimed in claim 11, characterized in that:
    the substrate has a center; and
    the amount of second reactant increases with increasing distance of the layer being deposited from the center of the substrate.

13. A method as claimed in claim 12, characterized in that the third reactant is provided in an amount yielding a concentration of material which increases the thermal expansion coefficient of the glass layers of from 0.5 to 3.0 mol%.

14. A method as claimed in claim 11, characterized in that the third reactant is provided in an amount yielding a concentration of material which increases the thermal expansion coefficient of the glass layers of from 0.5 to 3.0 mol%.

15. A method as claimed in claim 11, characterized in that during the deposition of the core layers, the second reactant is provided in a constant amount.

* * * * *